April 8, 1924.
H. C. EKLUND
1,489,934
CAMERA ATTACHMENT
Filed April 24, 1922
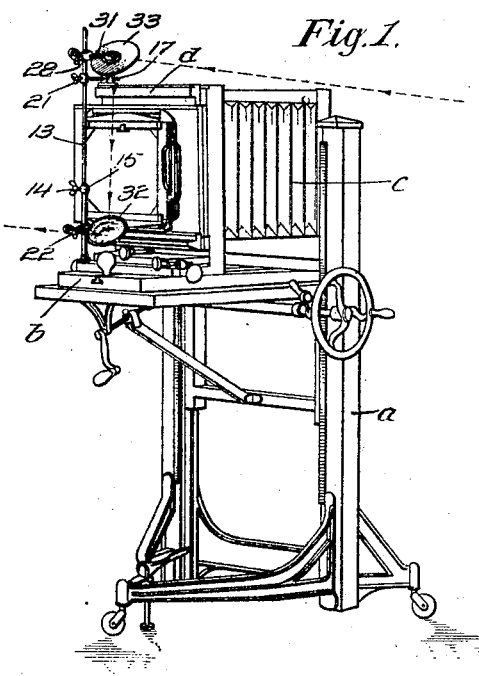
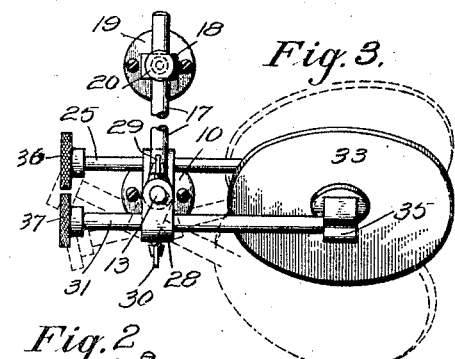
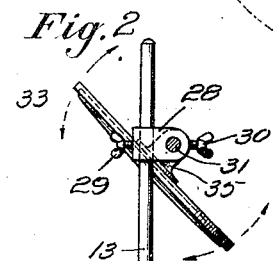
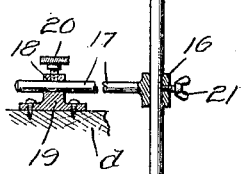
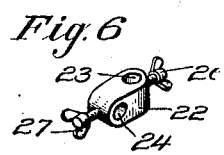
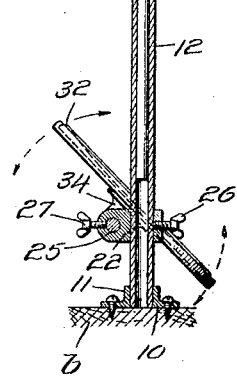
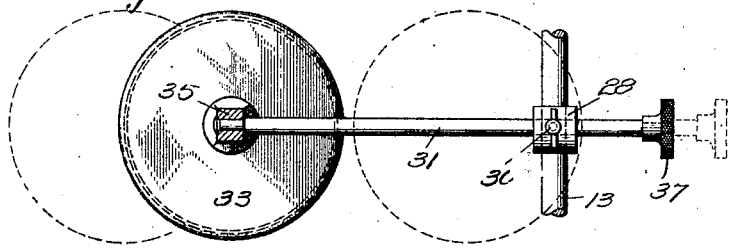
Hildore C. Eklund.
INVENTOR.
BY Geo. P. Kimmel.
ATTORNEY.

Patented Apr. 8, 1924.

1,489,934

UNITED STATES PATENT OFFICE.

HILDORE C. EKLUND, OF GREAT FALLS, MONTANA.

CAMERA ATTACHMENT.

Application filed April 24, 1922. Serial No. 556,236.

*To all whom it may concern:*

Be it known that I, HILDORE C. EKLUND, a citizen of the United States, residing at Great Falls, in the county of Cascade and State of Montana, have invented certain new and useful Improvements in Camera Attachments, of which the following is a specification.

This invention appertains to certain improvements in attachments for cameras generally, and more particularly to a type of finder attachment capable of use in conjunction with the ordinary forms of finders or focusing mediums.

The principal object of the invention is to provide for an attachment of the class described, and one of an extremely simple construction and arrangement and of a design to enable a photographer to make observations of a person or persons to be photographed without the latter being aware of the fact, and whereby to obtain more natural expressions and postures of such person or persons than it has been heretofore possible to obtain in the ordinary methods of focusing the camera and holding the determined focus for relatively long periods of time, when the person or persons being photographed are conscious of the fact that they are under direct observation.

Another object of the invention is to provide for an attachment of the class as hereinbefore characterized, and one of a comparatively inexpensive but efficient construction and arrangement of parts capable of being installed on known makes of cameras without the necessity of changing or otherwise modifying the construction or position of the usual parts of the latter, and which is also capable of being adjusted correspondingly for use on cameras of different sizes, as well as for making the desired observations of the subject to be photographed at varying distances from the camera.

With the foregoing and other objects in view, the invention resides in the certain novel and useful construction and arrangement of parts as will be hereinafter more fully described, set forth in the appended claims, and illustrated in the accompanying drawing, in which:—

Figure 1 is a perspective view of a conventional form of professional camera, and showing a preferred embodiment of the attachment as applied thereto, Fig. 2 is a side elevation of the attachment per se, Fig. 3 is a top plan view thereof, Fig. 4 is a fragmentary detail, partly in section, of the attachment and showing the manner of effecting the adjustment of one of the image reflecting bearers thereof, Fig. 5 is a perspective view of the upper of the members for mounting the attachment in position on a camera, and, Fig. 6 is a similar view of one of the adjustable mirror supporting devices.

Referring to the drawing, wherein similar characters of reference designate corresponding parts throughout the several views thereof, the reference character $a$ indicates a camera stand, of the form generally employed by professional photographers, having a base board or shelf $b$ thereon for the supporting in position of the camera $c$, which has its collapsible end carried in the frame $d$ in the usual manner.

The attachment, to be mounted in position at one side of the vertical longitudinal center of the camera and forwardly of the front end of the base of the camera $c$, when the same is in its extended condition, comprises a circular base plate 10, having a concentrically disposed nippled opening 11 therein, which is secured on the upper surface of the forward end of the camera base or support $b$, and a length of tubular stock 12 rising from the nippled opening 11. Adjustable vertically of the bore of the tubular member or length of stock 12 is a rod 13, which is secured in any of its desired positions of adjustment by means of a set screw 14 carried in a collar 15 secured on the upper end of the tubular member 12. To brace or otherwise secure the rod 13 free from vibration during the operation of the camera $c$, the same passes through an eye 16 formed at the outer end of a short rod 17, which is adjustably mounted in a stud 18 carried on a circular base plate 19, and secured in position on the top bar of the camera frame $d$. A set screw 20 is carried by the stud 18 for securing the short rod or arm 17 in its adjusted position therein, while a similar set screw 21 is provided in the eye 16 for clamping the rod section 13 in its adjusted position therein.

Slidably adjustable on the tubular member or section 12 is a clamp block 22 having two bores 23 and 24 passing therethrough, one at right angles to the other, the bore 23 engaging over the tubular member or section 12, and the bore 24 having passed through the same an adjustable rod section 25. Cooperative with the bore 23, of the clamp block 22, is a set screw 26 for securing the latter in its adjusted position on the tubular section or member 12, and, with the bore 24, a set screw 27 for similarly securing the rod 25 in any of its positions of adjustment. A second clamp block 28, identical to the clamp block 22, is engaged on the rod 13 and is provided with set screws 29 and 30, the set screw 29 for securing the same in adjusted position on the rod 13, and the set screw 30 for securing a rod section 31 in its adjusted position and correspondingly with that of the rod 25.

Mounted on the ends of the parallel and horizontally disposed rods 25 and 31, at one side of the standard formed by the tubular section 12 and the rod section 13, are opposed mirrors 32 and 33, respectively, each of which having centrally disposed and transversely apertured studs 34 and 35 projecting from their back walls, in which are engaged the ends of the rods 25 and 31, while the other ends of the latter are each provided with knurled finger pieces or knobs 36 and 37, whereby, upon the loosening up of the set screws 27 and 30, in the clamp blocks 22 and 28, the rods 25 and 31 may be turned to vary the angular relation of the mirrors 32 and 33, one with respect to the other, as desired or necessary.

In the use of the attachment as thus constructed, arranged, and installed in position in a camera, the lower mirror 32 will be adjusted in proper angular relation to have reflected therein the image of the subject to be photographed, and preferably after the camera $c$ has been focused on the subject, when the upper mirror 33 will be set at a reversed angular position with respect to the lower mirror 32, and until its active surface is substantially parallel to that of the same, or is otherwise positioned to have the image reflected from the mirror 32 thereto, when this reflected image will be observed in the upper mirror 33 by the photographer from his position in rear of the camera. It is to be understood, that the upper mirror 33 is always adjusted vertically on the rod section 13 to a position above the upper bar of the camera frame $d$, and in correct line of vision to the photographer whereby he can casually observe the mirror 33 without the knowledge of the subject, and can effect the operation of the camera for the taking of the picture when he is satisfied with the posture and facial expression of the latter as is disclosed to his view in the mirror 33.

From the foregoing, it will be readily apparent, that the attachment provides for greater possibilities in obtaining more natural facial expressions and postures from persons being photographed than can now be obtained from such persons when being entirely conscious of the stare of the photographer through the usual sight or focusing opening of the camera, and that the camera can be operated, after the same has been initially focused in the usual manner, when the photographer may be, seemingly to the subject, not ready to perform such operation, and when the subject is more at ease and free from the usual set or rigid state occurring in most instances under the ordinary methods used in the making of photographs.

It is also to be understood that, while a preferred embodiment of the attachment has been described and illustrated herein in specific terms and details of construction, arrangement and operation, various changes in and modifications of the same may be resorted to without departing from the spirit of the invention, or the scope of the claims appended hereto.

Having thus described the invention, what is claimed, is:—

1. In combination a support having a camera mounted thereon, a telescopic standard comprising a stationary and an adjustable section, said standard rising from said support at the back and at one side of the longitudinal center of said camera, said stationary section fixed to said support and said adjustable section extended above the camera, a brace positioned on the upper part of the camera and detachably engaging with said adjustable section, an adjustable reflecting element carried by said stationary section and disposed at an inclination and having its reflecting surface projecting upwardly, and an adjustable reflecting element carried by said adjusting section above the camera and having its reflecting surface opposing said reflecting surface of the other element and projecting forwardly.

2. The combination with a support provided with a camera, of a telescopic standard arranged rearwardly thereof and including an adjustable section, a reflector element adjustably connected to the lower portion of said standard and arranged rearwardly of the lower portion of the camera and having its reflecting surface extending upwardly, and a reflecting element carried by said adjusting section above the camera and having its reflecting surface opposing the reflecting surface of the other element and reflecting downwardly.

3. A finder attachment for use in connection with the focusing mediums of cameras comprising a telescopic standard including a fixed and an adjustable section and adapted to be positioned rearwardly of the focusing medium of a camera, an adjustable support carried by said fixed section and disposed at right angles with respect thereto, a rearwardly directed reflector element adjustably mounted on said support, an adjustable support carried by said adjustable section and disposed at right angles with respect thereto, and a forwardly directed reflector element adjustably mounted on said last mentioned support and cooperating with and opposing said other reflector element.

4. A finder attachment for use in connection with the focusing mediums of cameras comprising a telescopic standard including a fixed and an adjustable section and adapted to be positioned rearwardly of the focusing medium of a camera, an adjustable support carried by said fixed section and disposed at right angles with respect thereto, a rearwardly directed reflector element adjustably mounted on said support, an adjustable support carried by said adjustable section and disposed at right angles with respect thereto, a forwardly directed reflector element adjustably mounted on said last mentioned support and cooperating with and opposing said other reflector element, and an adjustable brace element disposed at right angles with respect to and adjustably connected to said adjustable section.

5. A finder attachment for use in connection with the focusing mediums of cameras comprising a vertically disposed telescopic standard including a fixed and an adjustable section and adapted to be positioned rearwardly with respect to the focusing medium of the camera, a supporting element mounted on each of said sections and provided with a vertical and a horizontal opening, said elements disposed at right angles with respect to said sections, said sections extending through said vertical openings, means for adjustably securing said supporting elements to said sections, rods extending through said horizontal openings, a forwardly and a rearwardly directed reflector element opposing each other and each carried by one of said rods and oppositely disposed with respect to each other, and means for adjustably connecting said rods to said supporting elements.

6. A finder attachment for use in connection with the focusing mediums of cameras comprising a vertically disposed telescopic standard including a fixed and an adjustable section and adapted to be positioned rearwardly with respect to the focusing medium of the camera, a supporting element mounted on each of said sections and provided with a vertical and a horizontal opening, said elements disposed at right angles with respect to said sections, said sections extending through said vertical openings, means for adjustably securing said supporting elements to said sections, rods extending through said horizontal openings, a forwardly and a rearwardly directed reflector element opposing each other and each carried by one of said rods and oppositely disposed with respect to each other, means for adjustably connecting said rods to said supporting elements, and an adjustable brace element adjustably connected to said adjustable section and disposed at right angles with respect thereto.

7. A finder attachment for use in connection with the focusing mediums of cameras comprising the combination with a support provided with a camera body, of a vertically adjustable standard fixed at the back of said support rearwardly with respect to the focusing medium of the camera body, and further to one side of the longitudinal center of the camera body, an adjustable rearwardly directed reflector carried by the lower portion of said standards rearwardly of and in proximity to the focusing medium of the camera body, an adjustable reflector arranged over the first mentioned reflector and cooperating therewith, said last mentioned reflector having its reflecting surface opposing the reflecting surface of the other reflector and projecting forwardly, and means for connecting the upper reflector to the upper portions of said standard, said upper reflector positioned above the focusing medium of the camera.

8. A finder attachment for the focusing mediums of cameras comprising a vertically disposed lengthwise adjustable standard having a fixed lower portion adapted to be positioned rearwardly of and to one side of the vertical center of the focusing medium of the camera, a pair of oppositely disposed reflector elements arranged in superposed relation and cooperating with each other, said elements adapted to be positioned rearwardly of the focusing medium and said upper element positioned above the focusing medium, said upper element directed forwardly and said lower element directed rearwardly, vertically disposed adjustable supports carried by the standard, and means for connecting said elements to said supports, said means providing for the angularly adjusting of said elements with respect to said standards.

9. A finder attachment for the focusing mediums of cameras comprising a vertically disposed lengthwise adjustable standard having a fixed lower portion adapted to be positioned rearwardly of and to one side of the vertical center of the focusing medium of the camera, a pair of oppositely disposed reflector elements arranged in superposed relation and cooperating with each other, said elements adapted to be positioned rearwardly of the focusing medium and said upper element positioned above the focusing medium, said upper element directed forwardly and said lower element directed rearwardly, vertically disposed adjustable supports carried by the standard, and means for connecting said elements to said supports, said means providing for the angularly adjusting of said elements with respect to said standards, and an adjustable brace element adjustably connected with said standard and disposed at right angles with respect thereto.

In testimony whereof, I affix my signature hereto.

HILDORE C. EKLUND.